Feb. 24, 1970 D. GOLD ET AL 3,497,121

REGISTER CONTROL SYSTEMS

Filed March 13, 1968 3 Sheets-Sheet 1

Inventor
DANIEL GOLD
DENNIS HERBERT BENT
By
KEMON, PALMER, STEWART
+ ESTABROOK
Attorney REGISTER CONTROL SYSTEMS
Filed March 13, 1968 3 Sheets-Sheet 2
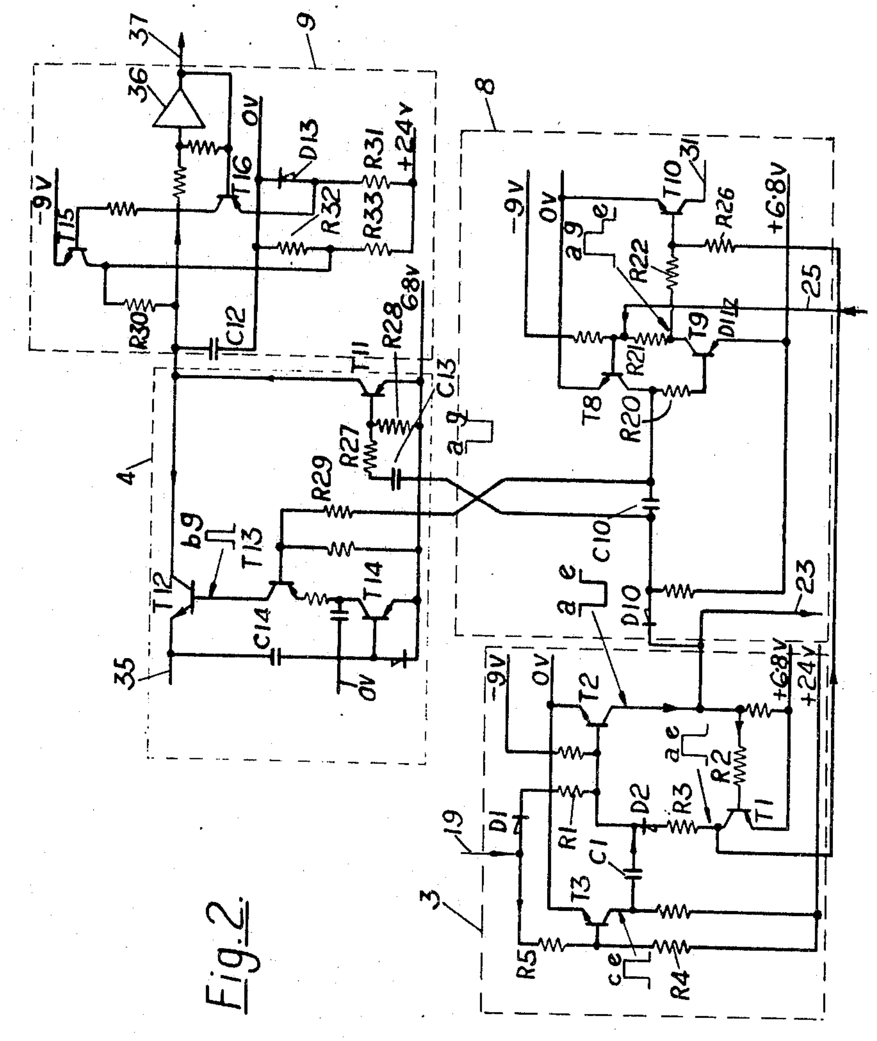
Fig. 2
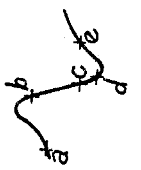
Inventor
DANIEL GOLD
DENNIS HERBERT BENT
By
KEMON, PALMER, STEWART
+ ESTABROOK
Attorney Inventor
DANIEL GOLD
DENNIS HERBERT BENT
By
KEMON, PALMER, STEWART
& ESTABROOK
Attorney United States Patent Office 3,497,121

Patented Feb. 24, 1970

3,497,121

REGISTER CONTROL SYSTEMS

Daniel Gold and Dennis Herbert Bent, London, England, assignors to Crosfield Electronics Limited, London, England, a British company Filed Mar. 13, 1968, Ser. No. 712,788
Claims priority, application Great Britain, Mar. 14, 1967, 11,966/67
Int. Cl. B65h 23/00
U.S. Cl. 226—2 8 Claims

ABSTRACT OF THE DISCLOSURE

Register control of a moving web is achieved by mounting a magnetic pole piece on a shaft, rotating in synchronism with the operation of a folder, printer, etc., to which the web is being fed; selecting a ramp waveform from a signal derived from a fixed coil adjacent the path of the magnetic pole piece; passing the ramp waveform through an A.G.C. circuit to render it independent of speed of rotation of the shaft; and gating the ramp waveform by a pulse, derived from a photoelectric head as a consequence of the passage of a register mark or edge already printed on the web, to obtain from the latter a signal representing the magnitude of the register error. The error signal is then applied to conventional register-shifting means.

When a web of material is passed through a machine, it is frequently necessary to maintain good register between a repeated pattern (either pre-printed on the web before it enters the machine or printed on the web in the machine in a preliminary stage) and a subsequent operation such as sheeting, folding or punching. To maintain good register, it is necessary to fix at least one point on each repeat as the reference point and this can be the straight edge of a block of print, perpendicular to the direction of web travel, preceded by a short length of unprinted web; or it can be special marks, known as "register marks" printed between the successive patterns with unprinted webs extending for a short distance on each side. In the case of multicolour printing, there may be a register mark for each colour and these may be separately detected and compared to derive a signal representing the register error. Photosensitive scanning heads are normally used to detect the passage of the register mark.

In other cases, a signal derived from the passage of a register mark representing the position of the existing pattern on the web is compared with a further register signal derived from, for example, a rotating shaft synchronised with the subsequent operation to be performed on the web. In both cases, it will be appreciated that if the signal is derived as a function of the interval between register signals, since the press speed may vary, this interval error signal must be multiplied by the press speed in order to give a true representation of the error length on the web.

According to the present invention, a magnetic device operating cyclically and in synchronism with the said subsequent operation is used for the generation of a ramp voltage during a substantially constant portion of the cycle and a further signal derived from the passage of a reference edge or mark related to the printed areas on the web, is used to gate the ramp voltage so that the gate output represents a portion of the ramp voltage defined by the instant of passage of the reference edge or mark, the peak amplitude of the ramp voltage being maintained substantially constant so that the gate output also represents the register error between the existing pattern and the subsequent operation performed by he machine. By maintainting the peak amplitude substantially constant we make the output independent of press speed.

It will be seen that with this arrangement the output signal represents error length without the necessity of a multiplication by press speed and furthermore that the use of a magnetic system to generate the ramp voltage enables a substantially constant output for a given ramp speed and thus avoids difficulties which would be inherent in, for example, a photoelectric system, which would require a shutter and would be subject to failure of the lamp, and in which in addition it would be necessary to take into account the ageing of the photoelectric cell.

The magnetic system for generating the ramp voltage may consist of a fixed coil unit with a disc driven in synchronism with the subsequent operation to be performed on the web, the disc carrying a single mild steel pole piece. The coil unit may consist of a round bar magnet terminating in a second pole piece and surrounded by a coil. At each revolution of the disc, its pole piece sweeps past that on the coil unit and as a consequence a signal is generated in the coil unit. The coil unit is made adjustable to permit the equipment to be set to a condition in which the register signal derived from the web coincides with a predetermined point on the ramp waveform for correct register.

The waveform produced by such an arrangement progressively increases in one polarity to a maximum, after which there is a steep reversal to a maximum in the opposite polarity, followed by a decline to the initial voltage. The central steep portion is substantially straight and this is the portion which is used to derive an output voltage proportional to the error voltage. However, as pointed out above, the amplitude of this waveform is dependent on the speed of the magnetic waveform generator and consequently the waveform is applied through a gain control circuit before comparison with the register signal derived from the existing pattern.

To avoid accidental generation of signals from portions of the pattern between register marks, a gating signal is derived from the same magnetic waveform, the leading edge of the gating signal corresponding to a point on the initial rising portion of the waveform and the trailing edge of the gating signal to a corresponding point in the final portion of the waveform following the substantially straight ramp voltage. The shape of the waveform is substantially independent of speed, so that the time interval defined by the maximum and minimum points of the waveform and by the leading and trailing edges of the gating pulse derived from this waveform always represent the same portion of a revolution of the disc in the magnetic switch unit. Typically, the ramp waveform may extend for about 3.6 degrees of the total revolution, whilst the gating pulse extends for about 18 degrees of the revolution.

In the preferred form of the apparatus, the ramp voltage is used to charge a capacitor, the charging operation being terminated by the arrival of the register pulse derived from the existing pattern on the web.

In order that the invention may be better understood, one example will now be described with reference to the accompanying drawings, in which:

FIGURE 2 is a circuit diagram for parts of the block diagram of FIGURE 1;

Figures 1, 4:
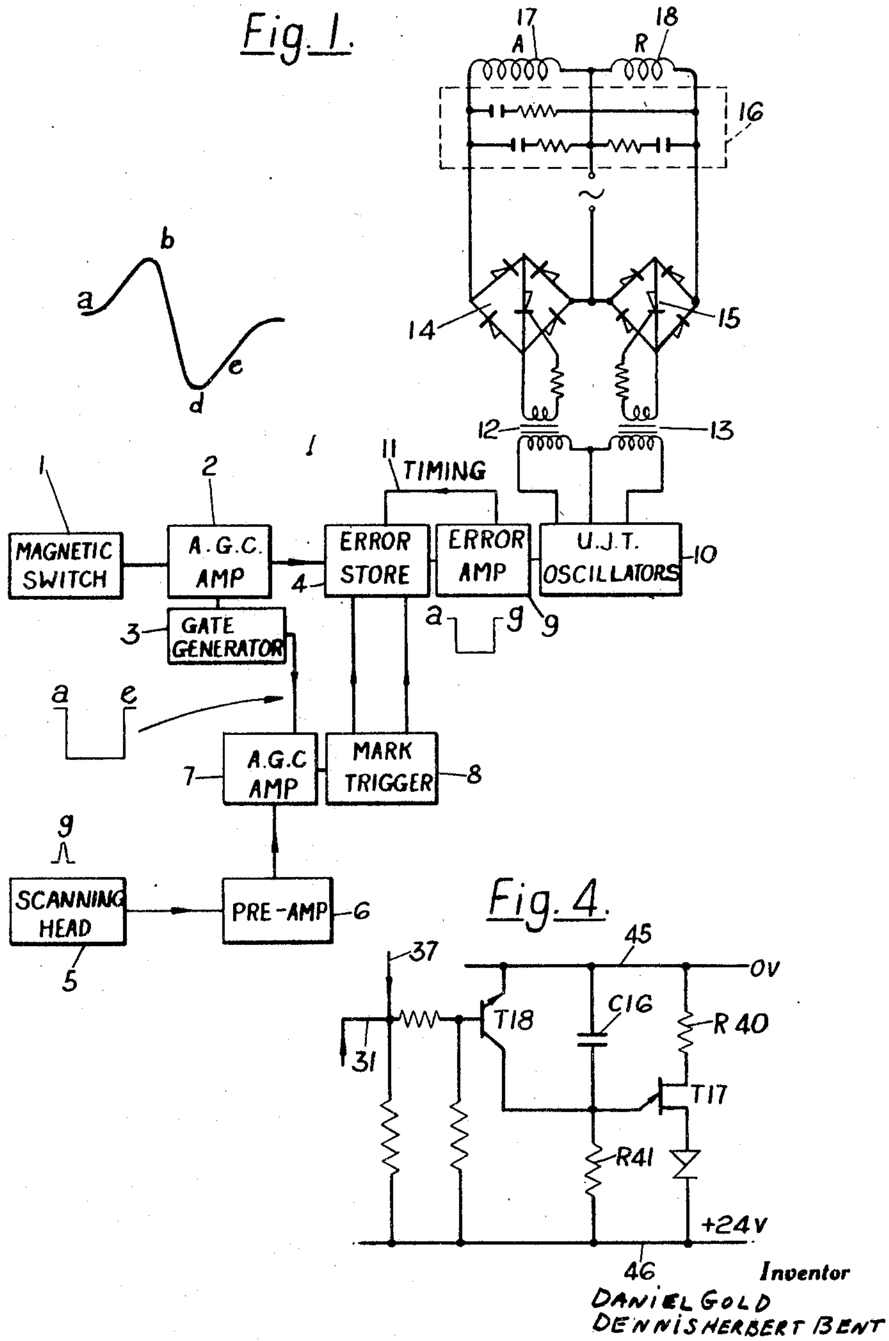
FIGURE 1 is a block diagram of apparatus employing the invention.
FIGURE 4 shows the basic circuit of the unijunction transistor oscillator.

Referring to FIGURE 1, a magnetic switch unit 1 generates the voltage *a*, *b*, *d*, *e*, the region *b*–*d* of which is almost straight. The points *a* and *e* are those which will be used to define the front and back edges of the square gating pulse which is used to gate the register mark from the other printed matter. This waveform is applied to an A.G.C. (automatic gain control) amplifier 2 the output of which is a pulse of similar shape but of a predetermined amplitude, the amplitude *b–d* being about 12 volts in the example which is being described. This output is fed to a gate circuit 3 which generates the square pulse *a–e*, and the portion *b–d* of the output of the A.G.C. amplifier is also used to charge a correction capacitor in the "error store" 4 to error voltage.

The scanning head 5 includes a photoelectric cell which generates a current approximately proportional to the amount of light falling on it. As a consequence, it generates a thin pulse *g*, corresponding to the register mark, which is amplified in a preamplifier 6 and applied to an A.G.C. amplifier 7. The pulse from the gate circuit 3 is used to gate this register pulse in the amplifier 7, that is to say to allow the amplifier to pass a pulse from the scanning head 5 only during the period defined by the gate pulse. Thus a single positive pulse passes once for each repeat of the register mark. This pulse is applied from the A.G.C. amplifier to a mark trigger circuit 8. This is a bistable circuit which is switched on by the front edge of the gating pulse and switched off by the register mark. The output of the mark trigger circuit 8 is a square pulse having the duration *a–g*. This pulse controls the charging of the correction capacitor to error voltage as will be described more fully in connection with FIGURE 2.

Thus, if the register pulse *g* occurs within the linear region *b–d*, the output voltage of the error store 4 is the level on the ramp *b.d* which exists at the instant that the register mark appears. If the error is large enough to bring the register mark outside the region defined by *b–d*, the capacitor is charged to a maximum positive or maximum negative voltage.

The error capacitor in the error store is connected to the input terminal of the error amplifier 9. The output of this amplifier is connected to two unijunction oscillators in an oscillator block 10 such that when the output from the amplifier 9 is zero both oscillators are off.

The amplifier output is also fed back to the capacitor in the error store 4 through a timing connection 11 which slowly restores the capacitor voltage and the amplifier output to zero. This discharge is linear so that the amplifier 9 gives an output for a time proportional to the error voltage.

When the amplifier output is more positive than a given reference level, the appropriate oscillator (advance or retard) gives an output to pulse transformers 12 and 13, the outputs of which go to the gate electrodes of silicon-controlled rectifiers 14 and 15. These rectifiers are connected through a phase shift and suppression unit 16 to the advance and retard windings 17 and 18 of the correction motor. Thus, in response to an advance or retard correction signal, the motor runs in the appropriate direction for a time approximately proportional to the error.

The details of the A. G. C. amplifier 2 form no part of the present invention and this amplifier will therefore not be described in detail. The gate circuit 3 is shown in FIGURE 2. In the gate circuit, the transistors T1 and T2 constitute a bistable trigger circuit in which normally both transistors are off. The amplified magnetic switch output pulse is fed by way of a conductor 19 through D1 and R1 to the base of transistor T2. At point *a* on the pulse, base current flows into T2. This causes current to flow from the collector of transistor T2 through a resistor R2 to the base of transistor T1, causing collector current to flow through a resistor R3 and a diode D2 to the base of transistor T2, so that both transistors switch on and stay on.

A transistor T3 is used to switch off T1 and T2. Transistor T3 is normally conducting due to base current flowing through resistor R4 and the amplified magnetic switch output pulse supplies additional base current through resistor R5 in the first half of the pulse. As the pulse goes negative, the base current in transistor T3 is reduced until at point *c* base current is zero and consequently transistor T3 is cut off. This generates a positive pulse edge at the collector of transistor T3 which feeds more base current to transistor T2 through a capacitor C1, so that transistors T1 and T2 stay on. As the input pulse to R5 continues past point *c*, transistor T3 stays off until point *e* is reached, when transistor T3 begins to conduct again. This generates a negative edge at its collector, which switches off transistor T2 and consequently transistor T1 also.

Thus, square pulses *a–e* are generated at the collectors of transistors T1 and T2.

Figure 3:
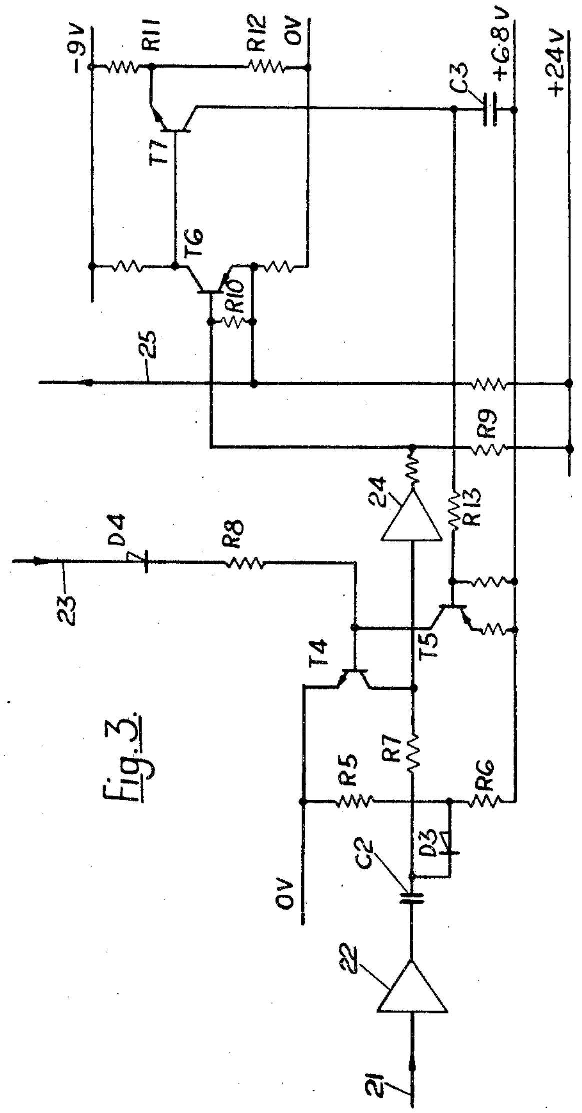
FIGURE 3 is a circuit diagram for another part of the block diagram of FIGURE 1.

Turning now to FIGURE 3, signals from the scanning head are applied by way of a conductor 21 to an amplifier 22 and the output of the amplifier is differentiated by a capacitor C2. The negative pulses resulting from the differentiation are limited by a diode D3 and a divider circuit including the resistors R5 and R6. The signal which passes C2 and the limiter circuit is applied to a gating circuit including a resistor R7 and a transistor T4. With the gate circuit closed, transistor T4 is fully conducting due to base current flowing through a diode D4 and a resistor R8, so that negligible signal appears at the collector of the transistor. The gate is opened by a pulse from the gate pulse generator 3 (FIGURE 2) on conductor 23 which is applied to the diode D4 and removes current in resistor R8. A much smaller base current flows to T4 from the collector of a transistor T5.

The resistor R7 and the transistor T4 attenuate the register mark pulse to a substantially constant amplitude. A feedback circuit is used to set the base current in T4 to the value which attenuates the input pulse by the right amount. The positive register mark pulse from the collector of transistor T4 is fed through an amplifier 24 to a phase-splitting circuit including a transistor T6. In the absence of signals, this transistor is cut off by the potential on its base due to a divider consisting of resistors R9 and R10. A negative pulse from the amplifier 24 overcomes this bias and the resulting signal at the emitter of transistor T6 is applied over line 25 to switch off the mark trigger circuit, as will be described later. The positive pulse which appears at the collector of T6 is applied to an A.G.C. control transistor T7. The latter transistor is cut off, owing to the potential at its emitter due to the resistors R11 and R12 and conducts only when the output pulses exceed a predetermined value. This value constitutes the A.G.C. delay voltage of the system and determines the controlled amplitude of the output pulses. Positive pulses at the collector of transistor T6 cause T7 to conduct and its collector current flows into a capacitor C3, charging it negatively. This causes base current to flow through a resistor R13 into the base of transistor T5 and as a consequence amplified current flows into the base of transistor T4. This provides the automatic gain control.

The mark trigger circuit 8 will now be described with reference to FIGURE 2. Basically, this consists of a bistable trigger circuit comprising transistors T8 and T9 which are normally cut off. The negative gate pulse *a–e* is fed through a diode D10 to a capacitor C10 and it produces current in a resistor 20 which flows into the base of transistor T9. This causes collector current to flow through resistor R21 to the base of transistor T8. The collector current of transistor T8 flows through a resistor R20 to the base of T9 so that both transistors now remain conducting.

They are switched off by the negative mark pulse *g* fed to a diode D11 by way of the conductor 25 (see also FIGURE 3). This cuts off T8 and hence removes base current in T9. In this way, opposite polarity square pulses

*g–g* are produced at the collectors of T8 and T9. The positive pulse from the collector of T9 is fed through a resistor R22 to a blocking circuit and the negative pulse from T8 is fed to the output circuit.

While transistors T8 and T9 are on, corrections are blocked by a transistor T10, which is normally non-conducting and conducts when base current flows in either the resistor R22 or a resistor R26, that is to say when either the gate or the mark trigger is on. When transistor T10 is conducting it blocks the output amplifier, the blocking signal being applied over a conductor 31 to the uni-junction transistor oscillators.

The blocking signal ensures that the output circuits are inoperative during the brief interval when the new register error is being established.

Signals from the mark trigger circuit are applied to the output stage. The output stage includes a capacitor C12 (10 microfarads) which constitutes the correction capacitor. It is charged to error voltage from the magnetic switch output pulse. This capacitor is first charged to plus 6.8 volts through a transistor T11 and is then discharged through a transistor T12 to error voltage. Conduction in transistor T12 is controlled by two transistors T13 and T14 and the emitter of T12 is connected by way of conductor 35 to the output of the A.G.C. amplifier 2 (FIGURE 1).

Transistor T11 is cut off until a gate pulse is applied to it by way of capacitor C13 and resistor R27. Capacitor C12 (the correction capacitor) then rapidly charges to plus 6.8 volts. The transistor T11 cuts off after about 2 milliseconds because capacitor C13, with resistors R27 and R28, has a differentiating action.

Transistor T12 is switched on when both T13 and T14 are conducting since base current to T12 must flow through these two transistors in series. Transistor T14 is switched on by the linear region *b–d* of the magnetic switch pulse, which feeds base current to T14 through capacitor C14. Transistor T13 is switched on by the negative square pulse *a–g* fed through a resistor R29 to the base of the transistor. Consequently, transistor T12 switches on at *b* and switches off at *g* leaving capacitor C12 charged to the error voltage. If, however, the mark comes before point *b*, T12 does not switch on and C12 is charged to plus 6.8 volts. The error voltage input is applied to an amplifier 36, the output of which is applied by way of conductor 37 to the uni-junction transistor oscillators.

Transistors T15 and T16 constitute a timing circuit. In the absence of input signals, the output of the amplifier 36 is held at earth potential by the transistors T15 and T16, which feed back to capacitor C12 through a resistor R30. A resistor R31 and a diode D13 normally hold the emitter of transistor T16 at a slight positive potential and consequently T16 will conduct only if its base (and therefore the output of amplifier 36) are at about 0 volt. If the amplifier output is more positive than this, transistor T16 is cut off, together with transistor T15, and in this case capacitor C12 is charged through resistor R30 from a positive 9 volt source, as determined by the potential divider comprising resistors R32 and R33. The charge on capacitor C12, amplified by amplifier 36, takes the output of this amplifier negative until transistor T16 conducts, that is to say until the output of the amplifier becomes 0 volt.

If the amplifier output is more negative than 0 volt, transistor T16 takes all the current in resistor R31 and diode D13 cuts off. As a consequence, transistor T15 bottoms and capacitor C12 is charged negatively from a minus 9 volt source through R30 and transistor T15. This, through the amplifier 36, takes the output of the latter positive until diode D13 again conducts, that is to say until this amplifier output is at 0 volt.

In a similar way, when an error voltage is applied to capacitor C12, the timing circuit operates so as to discharge capacitor C12 linearly until the output is zero. Thus, corrections are proportional to the voltage applied to capacitor C12, that is to say proportional to the error.

The basic uni-junction oscillator circuit is shown in FIGURE 4. The uni-junction transistor T17 is connected in series with a resistor R40 between supply conductors 45 and 46 and the emitter of the transistor is connected to the junction of a capacitor C16 and a resistor R41. Thus, the capacitor will charge through the resistor until its voltage is sufficient for uni-junction transistor T17 to conduct, when C16 will discharge rapidly through the uni-junction transistor, after which the cycle will be repeated. In the circuit shown, the junction of the capacitor C16 and the resistor R41 is also connected to the collector of a transistor T18, the base of which receives a signal from the error amplifier by way of conductor 37 (see also FIGURE 2). In the circuit shown, the base of transistor T18 is also connected by way of a conductor 31 (see also FIGURE 2) to the blocking transistor T10. One of the uni-junction transistor oscillators goes into oscillation if the amplifier error voltage exceeds minus 1 and the other goes into oscillation if the amplified error voltage exceeds plus 1. As described in connection with FIGURE 1, these oscillations cause conduction of the silicon-controlled rectifiers and thus operation of the correction motor to advance or retard the register. The equipment which has been described may be used for maintaining good register between the print on a continuous web of material, and a subsequent operation such as sheeting, folding or punching. It can be used with plain webs which are printed and cut on the same machine or for controlling the register between a pre-printed web and the subsequent operation. It could also be used for maintaining register between successively applied colour component images, by bringing each colour component register mark into register with the ramp voltage. The correction motor may act in any of a number of known ways to reduce the register error. In one arrangement between the last printing cylinder and the cutting knife, the web passes round a roller whose position can be varied by the correction motor, thus increasing or reducing the length of web between the cylinder and knife and so retarding or advancing the register between print and cut. In another arrangement, before entering the cutting mechanism the web passes through a pair of rollers, one steel the other rubber, tightly pressed together. The steel roller is driven by the main drive shaft of the machine through a correction gear-box of differential or epicyclic construction. The gear-box has three external shafts, an input which is driven by the main drive, an output which connects to the draw-roller and a correction shaft which enables small advance or retard corrections to be made to the web.

We claim:

1. A method of correcting the register error of a moving web having a succession of printed areas and register marks, with respect to a cyclically operating magnetic device driven in synchronism with a further operation to be performed on the web, comprising: generating a ramp voltage during a substantially constant portion of the cycle of operation of the said device; generating a signal from the passage of a register edge or mark on the said printed web and related to the printed areas on the web; gating the ramp voltage with the said signal so that the gate output represents a portion of the ramp voltage defined by the instant of passage of the reference edge or mark; maintaining a substantially constant peak amplitude for the ramp voltage so that the gate output represents the register error between the printed areas and the operation of the magnetic device; and using the said gate output to control the operation of register correction means which advance or retard the printed areas on the web and the register mark relative to the operation of the said cyclic device.

2. A method in accordance with claim 1, including deriving from the operation of the said magnetic device a gating waveform to permit the generation of a register mark signal from the said reference edge or mark only during the existence of the gating waveform.

3. A method in accordance with claim 1, in which a register correction voltage is derived on a capacitor by charging the capacitor to one extreme of the ramp voltage, rapidly discharging the capacitor in accordance with the change in ramp voltage until the register signal is generated, then applying the voltage on the capacitor to a register error output circuit and slowly and substantially linearly discharging the capacitor whereby the correction signal from the output circuit exists for a duration which varies with the magnitude of the error.

4. Apparatus for carrying out the method of claim 1, including: a cyclically operating magnetic device, driven in synchronism with a further operation to be performed on the web; means responsive to the said magnetic device to generate a ramp voltage during a substantially constant portion of its cycle of operation; an automatic gain control circuit for maintaining the amplitude of the said ramp voltage at a given level, independent of the speed of operation of the said device; a register signal generator circuit, generating a signal in response to the passage of a reference edge or mark related to the positions of the printed areas on the web; a gating circuit controlled by the register signal so as to provide an output voltage dependent on the controlled-amplitude ramp voltage at the instant of passage of the reference edge or mark; and register correcting means responsive to the said gated ramp voltage to advance or retard the web with respect to the said device and thereby to correct the register error.

5. Apparatus in accordance with claim 4, in which the magnetic device and the means responsive thereto consist of a mangetic pole piece mounted for rotation in synchronism with the said further operation and a fixed coil mounted adjacent the path of the said pole piece.

6. Apparatus in accordance with claim 4, including a capacitor to which is applied the output voltage from the gating circuit, an amplifier receiving the capacitor voltage, and a timing circuit connected between the amplifier output and the capacitor and operating to discharge the capacitor in a substantially linear manner.

7. Apparatus in accordance with claim 4, in which the gating circuit includes a transistor controlled by two inhibiting circuits, one of which permits conduction by the transistor only during the central ramp portion of the waveform derived from the said magnetic device and the other of which permits conduction by the transistor only in the perod from the beginning of the waveform derived from the magnetic device to the instant of generation of the register signal, whereby the period of conduction of the transistor is from the beginning of the ramp voltage to the generation of the register signal.

8. Apparatus in accordance with claim 4, including a further gating circuit controlled by a gating waveform derived from the said magnetic device to permit the passage of a register signal only during the said gating waveform, and including a gating waveform generator including a bistable transistor trigger circuit which is switched from a first to a second condition at the beginning of the signal received from the magnetic device, the apparatus including a further transistor which changes from its normal condition to the opposite condition when the signal derived from the said magnetic device changes polarity and which thereafter reverts to its normal condition when the signal decreases to a sufficiently low amplitude and thereby restores the trigger circuit to its normal condition.

References Cited

UNITED STATES PATENTS

| | | | |
|---|---|---|---|
| 2,840,371 | 6/1958 | Frommer | 226—28 |
| 3,120,181 | 2/1964 | Thiede | 226—29 X |

ALLEN N. KNOWLES, Primary Examiner

U.S. Cl. X.R.

226—30, 45